Aug. 1, 1933.                R. CURRY                1,920,844
                        OIL CHANGING INDICATOR
                         Filed Sept. 19, 1932

Robert Curry,
                    INVENTOR
BY Victor J. Evans & Co.
                    ATTORNEY P. H. Hishey.
WITNESS Patented Aug. 1, 1933

1,920,844

UNITED STATES PATENT OFFICE 1,920,844

OIL CHANGING INDICATOR

Robert Curry, Louisville, Ky.

Application September 19, 1932
Serial No. 633,893

1 Claim. (Cl. 40—68)

This invention relates to indicators, and its general object is to provide an oil changing indicator primarily designed for motor vehicles that includes numbered disks with means for setting the disks in accordance with the readings on the odometer of the vehicle when the oil is changed in the engine thereof, so as to indicate the mileage when the next change of oil is to be made.

A very important object of the invention is to provide an oil changing indicator, with means for securing the numbered disks thereof in set or locked position, with the result the disks cannot be casually removed by vibration, or other causes, but when released can be set in an easy and expeditious manner.

A further object of the invention is to provide an oil changing indicator of the character set forth, that is simple in construction, easy to apply to the instrument board of a motor vehicle, is inexpensive to manufacture, and extremely efficient in operation and service.

This invention also consists in certain other features of construction and in the combination and arrangement of the several parts, to be hereinafter fully described, illustrated in the accompanying drawing and specifically pointed out in the appended claim.

In describing my invention in detail, reference will be had to the accompanying drawing wherein like characters denote like or corresponding parts throughout the several views, and in which:—

Figure 3 is a sectional view taken approximately on line 3—3 of Figure 2, looking in the direction of the arrows.

Figure 4 is a sectional view taken approximately on line 4—4 of Figure 2, looking in the direction of the arrows.

Figure 1:
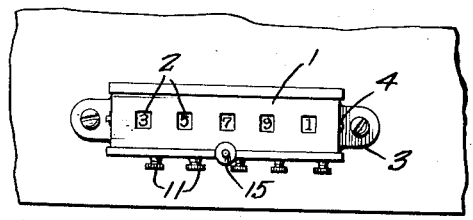
Figure 1 is a front view illustrating the oil changing indicator which forms the subject matter of the present invention in applied position.

Referring to the drawing in detail, the reference numeral 1 indicates the front wall of the casing or housing of my device, and it will be noted that the front wall is provided with sight openings 2 arranged in parallelism with respect to each other for a purpose which will be later described.

Formed with or otherwise secured to the rear wall and extending laterally therefrom are apertured ears 3 for the purpose of receiving screws or like means for securing the device to the instrument board of a motor vehicle or any suitable place adjacent to the odometer, of a motor vehicle.

Figure 2:
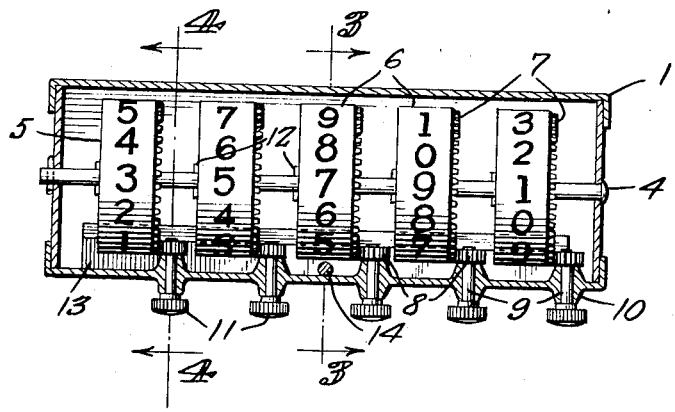
Figure 2 is a vertical longitudinal sectional view taken through the casing of my device, with parts in elevation.
Figure 2:
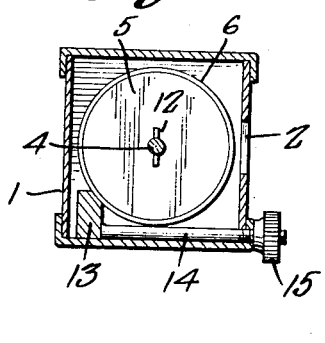
Figure 2:
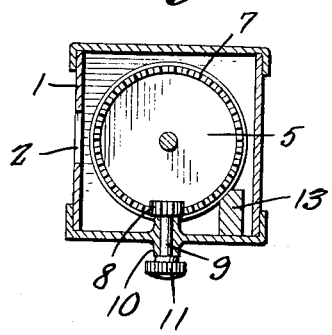

Extending longitudinally through the casing and mounted in the end walls thereof is a shaft 4 which has mounted for rotation thereon at spaced intervals a plurality of disks 5 provided with peripheral bands 6 which have arranged on the outer surface thereof numerals corresponding to the numerals of an odometer as will be apparent upon inspection of Figure 2. The disks are arranged whereby one numeral of each band can be seen through the sight openings as shown in Figure 1.

Formed with or otherwise secured to the disks and extending laterally therefrom are gears 7 and arranged to mesh with the teeth of the gears 7 are gears 8 which are mounted on the inner ends of stub shafts 9 that are journaled in bearings 10 which are formed with the bottom wall of the casing as best shown in Figure 2. The stub shafts extend outwardly of the bottom wall and have secured to the outer ends thereof serrated knobs 11, whereby upon rotation of the knobs 11 the disks 5 will be rotated as will be apparent, to bring the desired numerals aligned with the sight openings, so that the disks can be set to correspond to the reading of the odometer of the vehicle on which the indicator is mounted when the oil is changed in the engine of the vehicle.

The disks are secured to the shaft 4 for rotation thereon and I have shown pins 12 extending through the shaft 4 and which are engageable with the disks for holding the teeth of the gears 7 in mesh with the teeth of the gears 8.

In order to hold the disks against rotation when the latter have been set by the knobs 11, I provide a locking means which includes a bar 13 of a length to engage the peripheral bands of all the disks and it will be noted that the bar has its upper forward corner reduced to follow the curvature of the bands to frictionally engage the same. The bar has secured to and extending forwardly from the front face thereof a rod 14 that extends through the front wall of the casing as best shown in Figure 3, and the rod is provided with a threaded outer end for the purpose of threadedly receiving a nut 15 which when tightened will hold the block in contact with the disks to prevent casual movement thereof, by vibration or other causes.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

An oil changing indicator comprising a casing having a front wall provided with sight openings, a plurality of disks mounted for rotation in said casing and having numbers thereon arranged to show through the sight openings, means for individually rotating said disks, a bar arranged longitudinally in the casing and slidable on the bottom thereof, a rod secured to said bar midway its ends and extending through the casing and means threaded on the outer end of said rod for moving the bar into and out of engagement with respect to the disks and being engageable with the casing for securing the bar in binding contact with the disks to prevent casual movement thereof.

ROBERT CURRY.